Nov. 23, 1971  M. CICOGNANI  3,621,727

WEAR-RESISTANT TOOTHED BELT

Filed April 3, 1970

INVENTOR
MARIO CICOGNANI

BY *Stevens, Davis, Miller and Mosher*

ATTORNEYS ns
3,621,727
WEAR-RESISTANT TOOTHED BELT
Mario Cicognani, Milan, Italy, assignor to
Industrie Pirelli S.p.A.
Filed Apr. 3, 1970, Ser. No. 25,463
Claims priority, application Italy, Apr. 14, 1969,
15,531/69
Int. Cl. F16g 1/18, 1/26, 1/22
U.S. Cl. 74—239      6 Claims

ABSTRACT OF THE DISCLOSURE

The disclosure comprehends a belted driving system having a wear-resistant toothed belt which comprises a body of chloroprene rubber. The body has a resistant core formed by cords selected among textile fibres, glass fibres and metallic wires. A self-lubricating fabric is utilized for covering the teeth of the belt and the intervening spaces.

---

The present invention relates to toothed belts, and more particularly, it refers to the belt teeth and space surface.

The expressions "toothed belts" means belts provided with teeth on at least one of their faces, by means of which they mesh with at least two toothed pulleys so as to form a driving system. In such driving system, the motion is transmitted by the pulley teeth meshing with the belt teeth. During the meshing, in particular in the steps of engagement and disengagement of the teeth, relative movements take place between the pulley teeth and the belt teeth.

In the field of toothed belts a problem which exists is that of reducing the teeth wear caused by the relative movements of the pulley teeth and belt teeth. Several types of toothed belts, differing from one another in respect of the tooth profile, and adapted to prevent slip, have been suggested and utilized in an attempt to solve this problem.

Due to the fact that the teeth of a toothed belt are made of elastomeric, i.e., elastic material, they deform in an uncontrolalble way under load, so that their profile, even if it has been accurately constructed, is altered.

Besides the deformation of the belt teeth, which explains the slip between them and the pulley teeth, it is to be noted that, in the driving system, a certain play has always to be allowed between the belt teeth and the pulley teeth; said play enhances the slip phenomenon when the motion is started or stopped and when driving systems with non-constant or even reciprocating torques, are involved.

As a result of the aforesaid slip, which cannot be completely eliminated and, from an economical standpoint, cannot be reduced beyond a certain limit by means of a more accurate construction or development of the teeth, considerable wear of the belt teeth takes place.

Besides the accurate construction of the teeth profile and careful selection of the most suitable material for their construction, another conventional well known expedient in the belt manufacture is that of covering the belt teeth and space surfaces with a fabric. The use of a fabric for this purpose is a palliative, since it does not act on the causes of the phenomenon, but serves only to reduce the belt wear due to the slip.

The present invention aims at solving the problem of minimizing the belt wear and consequently of increasing the belt service life.

Briefly summarized, the present invention provides a wear-resistant toothed belt, which comprises a body of elastomeric material preferably chloroprene rubber, a resistant core formed by cords selected among textile fibres, glass fibres and metallic wires, and a fabric for covering the belt teeth and spaces, and is characterized in that the fabric is self-lubricating. By means of such a combination, the increase in the service life of the toothed belt is not obtained by eliminating the slip between the belt teeth and the pulley teeth, but by reducing the friction coefficient during the slip. In fact, by reducing the friction coefficient, it is possible to obtain a sizable reduction in the teeth wear, and consequently a longer life of the belt.

The present invention will be better understood from the following detailed description, made by way of non-limiting example, with reference to the accompanying drawings, in which.

The toothed belt comprises a belt body 1 of elastomeric material, preferably chloroprene rubber. A resistant element is provided in the form of a plurality of cords 2 of a very low extensibility material, such as textile fibres having a high modulus of elasticity and which may include metallic wires or glass fibres. The belt also includes a plurality of teeth 3 made of elastomeric material, preferably chloroprene rubber, and a rubberized fabric 4 for covering the belt teeth and spaces.

Figure 1:
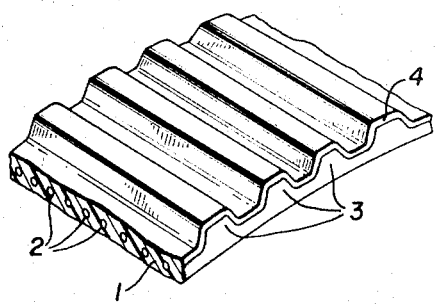
FIG. 1 is a fragmentary view of a toothed belt.
Figure 2:
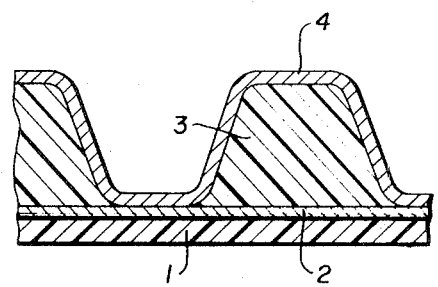
FIG. 2 shows, in cross-section, a tooth of a toothed belt on an enlarged scale.
Figure 3:
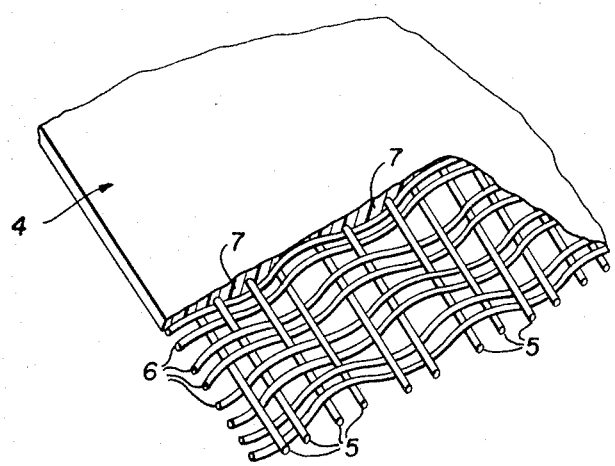
FIG. 3 illustrates in perspective view the fabric for covering the teeth and the spaces of a toothed belt.
Figure 4:
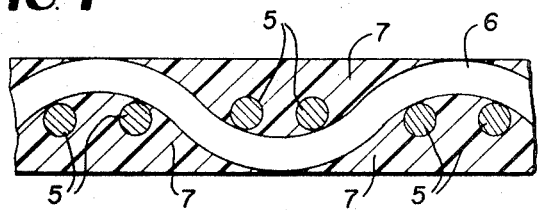
FIG. 4 is a section of the fabric for covering the teeth, taken perpendicularly to the warp threads.

An important feature of the belt according to the present invention is a new type of rubberized fabric for covering the belt teeth and spaces. This type of rubberized fabric is shown in FIGS. 3 and 4.

The fabric is provided with rectilinear warp threads 5, parallel to one another and coplanar or practically coplanar, and by weft threads 6 parallel to one another and having an undulated configuration. The provision of rectilinear warp threads and of undulated weft threads produces a fabric, the surface of which is provided with a plurality of grooves. In particular, in the preferred embodiment of the fabric, which is illustrated in FIG. 3, each warp thread 5 is interwoven with the weft threads, irrespective of the other warp threads. The weft threads 6 are instead interwoven two by two with the warp threads. The fabric in which the threads are arranged as above is therefore provided with a plurality of grooves 7, parallel to one another. For the purposes of the present invention, textures of different kind can be provided between the weft and the warp threads, except that such textures may cause grooves on the fabric surface, the presence of which is determinant. At the most, such grooves may be reduced to a plurality of depressions separated by protuberances.

It should be noted from the above that the most suitable fabrics are those whose texture is derived from twill or cassimere as, for instance, cross twill or twill-weave, or those whose texture is derived from satin or linen cloth, as rep or mat weave.

With reference to the preferred embodiment of the invention, a fabric well suitable for the purposes of the invention has the following characteristics:

Material used: Polyamide 66
Texture: Four end cassimere
Warp:
    Count-tex: 23.3
    Yarns/dm.: 290
    Twists/m.: 202
Weft:
    Count-tex: 23.3
    Yarns/dm.: 290
    Twists/m. 202

The grooves of the fabric are filled during the rubberizing operation with elastomeric material of a particular composition, the characteristics of which will be specified hereinafter, and the rubberizing treatment is such as not to practically alter the thickness the fabric had before such operation.

The elastomeric material which fills the grooves 7 appears on the surface of the fabric, but does not function as a true rubber sheet.

The constant thickness of the fabric covering the teeth of a toothed belt permits the correct positioning of the pitch line and ensures a regular and uniform pitch of the belt. The rubberizing fabric according to the present invention possesses this feature.

The presence of elastomeric material inside the grooves 7 of the fabric covering the teeth modifies the features of of the fabric surface due to the material constituting it.

The modification of the surface characteristics of the fabric is constant during the entire belt life, since the elastomeric material contained in the grooves constitutes a continuous reserve, appearing at the teeth surface even when, after a certain number of working hours, the fabric is partially squeezed or partially worn out.

In order to increase the belt life, once the fabric covering the teeth is applied, the grooves 7 must be inclined with respect to the mid-circumferential plane of the belt.

To achieve the purpose aimed at by the present invention, it is necessary that, besides using a particular type of fabric, the rubberizing operation be made with an elastomeric material having special characteristics. The elastomeric material must comply with two substantial requisites; namely, it must have sufficient resistance to wear like any rubberizing compound for covering belt teeth, and at the same time, it must have a very low friction coefficient. These requisites are met by adding to the compound for rubberizing the fabric some ingredients having a low friction coefficient, among which graphite and molybdenum sulphide, in a weight percentage ranging from 5% to 40%, have proven to be particularly suitable.

By way of example, the following formula has been determined to be suitable for the preparation of the elastomeric material intended to rubberize the toothed belts according to the present invention:

|  | Percent |
|---|---|
| Chloroprene rubber | 45.0 |
| Zinc oxide | 2.0 |
| Magnesium oxide | 1.8 |
| Mineral oil | 6.2 |
| Conductive black | 15.0 |
| Graphic or molybdenum sulphite | 30.0 |

It should be understood that, although a preferred embodiment of the present invention has been described and illustrated, the present invention includes any other possible embodiment deriving from the above disclosed inventive concept.

What is claimed as new is:

1. A wear-resistant toothed belt, which comprises a body of elastomeric material, preferably chloroprene rubber, a resistant core formed by strands selected among textile fibres, glass fibres and metallic wires, and a fabric for covering the belt teeth and spaces, and is characterized in that said fabric is self-lubricating.

2. A toothed belt as in claim 1, characterized in that the self-lubricating fabric for covering the belt teeth and spaces in provided with a plurality of grooves having in general an inclined path with respect to the mid-circumferential plane of the belt, said grooves being completely filled with an elastomeric material of a low coefficient of friction.

3. A toothed belt as in claim 2, characterized in that the grooves of the self-lubricating fabric are obtained by arranging the warp threads in rectilinear, parallel and coplanar relationship and the weft threads in parallel relationship, and according to an undulated path.

4. A toothed belt as in claim 2, characterized in that the elastomeric material for impregnating the fabric and for filling its grooves is a fabric rubberizing compound containing graphite.

5. A toothed belt as in claim 2, characterized in that the elastomeric material for impregnating the fabric and for filling its grooves is a fabric rubberizing compound containing molybdenum sulphide.

6. A toothed belt as in claim 2, characterized in that the elastomeric material for impregnating the fabric and for filling the grooves thereof is constituted by a fabric rubberizing compound containing at least an ingredient having a low friction coefficient, in a percentage ranging between 5% and 40% by weight.

References Cited

UNITED STATES PATENTS

| 2,167,384 | 7/1939 | Freedlander | 74—237 |
| 2,211,202 | 8/1940 | Freedlander | 74—237 X |
| 2,718,791 | 9/1955 | Hose et al. | 74—239 |
| 2,793,150 | 5/1957 | Deaves | 74—237 X |
| 3,078,205 | 2/1963 | Sauer et al. | 74—237 X |
| 3,535,946 | 10/1970 | Miller | 74—237 X |

LEONARD HALL GERIN, Primary Examiner

U.S. Cl. X.R.

74—231 C, 231 P, 232, 237; 139—435